United States Patent
Niesyn

(10) Patent No.: US 6,284,968 B1
(45) Date of Patent: Sep. 4, 2001

(54) SOLAR-TRACKING SYSTEM

(76) Inventor: Joseph Z. Niesyn, 126 S. Helberta Ave. Unit 4, Redondo Beach, CA (US) 90277

(*) Notice: Subject to any disclaimer, the term of this patent is extended or adjusted under 35 U.S.C. 154(b) by 0 days.

(21) Appl. No.: 09/596,371

(22) Filed: Jun. 19, 2000

(51) Int. Cl.⁷ .............................. H01L 31/042; F24J 2/38
(52) U.S. Cl. .................. 136/246; 136/259; 126/600; 126/605; 126/601; 126/602; 126/603; 250/203.4
(58) Field of Search .................... 136/246, 259; 126/600, 605, 601, 602, 603; 250/203.4

(56) References Cited

U.S. PATENT DOCUMENTS

| | | | |
|---|---|---|---|
| 3,305,686 | * 2/1967 | Carter et al. ............... 250/203.4 |
| 4,172,739 | 10/1979 | Tassen ........................ 136/246 |
| 4,202,321 | * 5/1980 | Volna ......................... 126/605 |
| 4,995,377 | 2/1991 | Eiden ......................... 126/605 |
| 5,253,637 | 10/1993 | Maiden ....................... 126/696 |
| 5,317,145 | 5/1994 | Corio ......................... 250/203.4 |
| 5,600,124 | 2/1997 | Berger ........................ 250/203.4 |
| 5,632,823 | * 5/1997 | Sharan ........................ 136/246 |

* cited by examiner

Primary Examiner—Alan Diamond
(74) Attorney, Agent, or Firm—Milton S. Gerstein

(57) ABSTRACT

A solar-tracking system that provides a polar rotation at a constant velocity of 366.25 revolutions clockwise per year, and orbital revolution that is one revolution per year in the counter-clockwise direction. The support for the orbital drive system is tilted from polar drive system at an angle of 23.45 degrees, and is constant, which angle is equal to the earth's axis tilt from orbital axis.

15 Claims, 2 Drawing Sheets

SOLAR-TRACKING SYSTEM

BACKGROUND OF THE INVENTION

The present invention is directed to a system for changing the orientation of a solar-dependent system, such as solar-heating apparatuses, solar-generators, solar concentrators, telescopes, and the like. Prior-art systems have depended upon azimuth, or vertical, axis-tracking, which can lead to erroneous results, and which are difficult to achieve. This lack of a reliable, accurate and appealing solar-tracking systems has been a major stumbling block to the success and expansion of the solar industry.

Examples of prior-art solar-tracking systems are shown in the following U.S. patents. In U.S. Pat. No. 5,317,145, the solar-tracking system uses a loop-control tracking with two linear actuators to control elevation, or latitude, and to control rotation. The system of this patent has a maximum of 120-degree rotational tracking that translates to eight hours per day maximum, and has a vertically-oriented support.

U.S. Pat. No. 4,172,739 discloses a similar system also using a perfectly-vertical support shaft.

U.S. Pat. No. 5,600,124 discloses a sun-tracking system using cam and roller principle and gravity. Like the other systems, a perfectly vertical support shaft is used.

U.S. Pat. No. 4,995,377 discloses a solar collector having photovoltaic panels that track the latitude of the sun. In this system, also, the support shaft is perfectly vertically-oriented.

U.S. Pat. No. 5,253,637 discloses a sun-tracking system based on a linear actuator for elevational tracking, and another linear actuator for azimuthal axis. The support is also vertically-oriented.

SUMMARY OF THE INVENTION

It is the primary objective of the present invention to provide a solar-tracking apparatus based on the tracking of the two components of the earth-to-sun motion: To wit, polar rotation and orbital rotation.

Toward these and other ends, the solar-tracking system of the present invention provides a polar rotation at a constant velocity of 366.25 revolutions clockwise per year, and an orbital revolution that is slightly variable of one revolution per year in the counter-clockwise direction. The support for the orbital system is tilted in in respect to polar axis at an angle of 23.45 degrees, and is constant, which angle is equal to the earth's tilt, which is in contrast to prior-art systems which do not utilize polar-axis based tracking.

BRIEF DESCRIPTION OF THE DRAWINGS

The invention will be more readily understood with reference to the accompanying drawings, wherein.

DETAILED DESCRIPTION OF THE INVENTION

Figure 1:
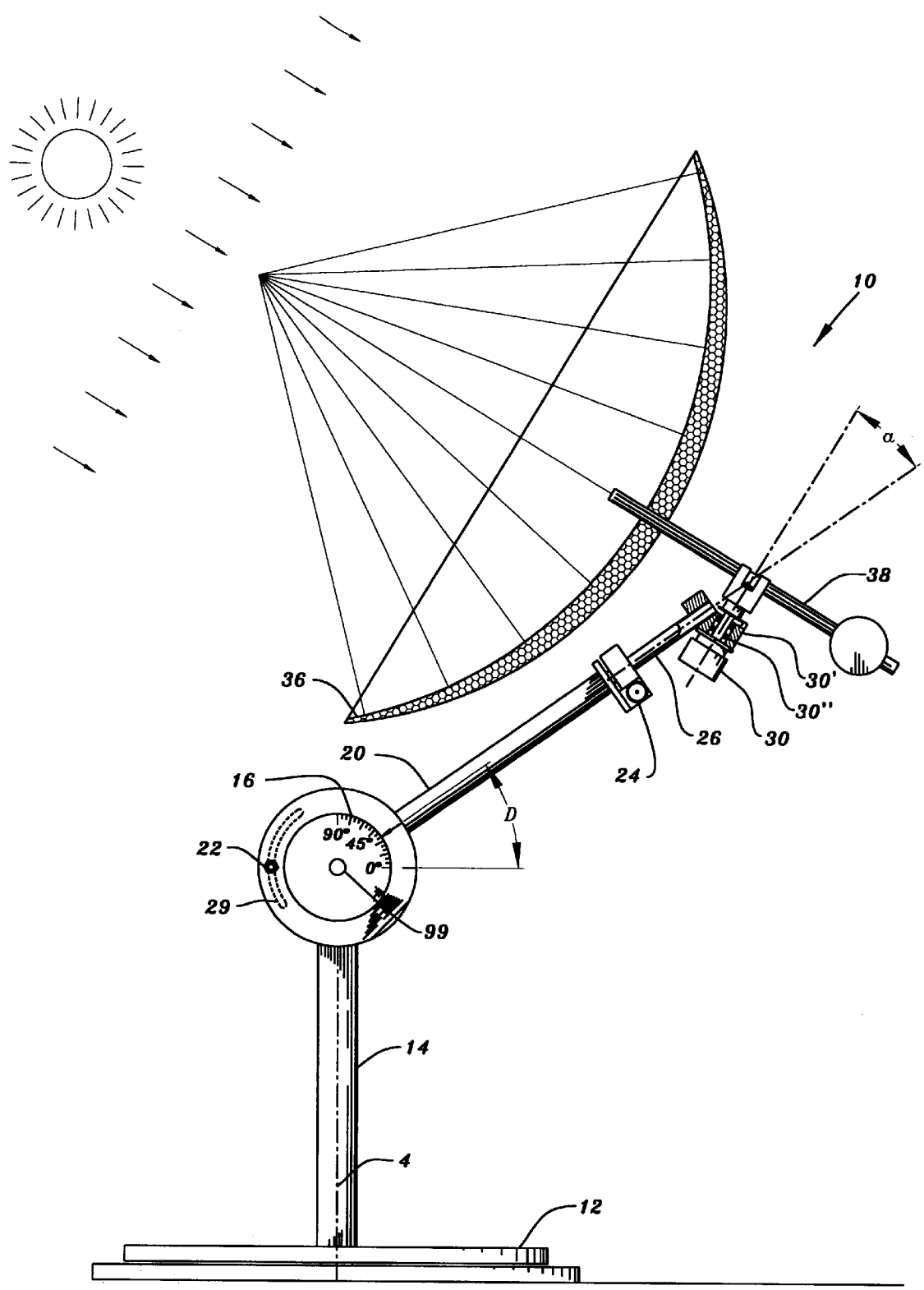
FIG. 1 is a side elevational view of the first embodiment of the invention as a portable unit.

Referring now to the drawings in greater detail, there is shown in FIG. 1 a portable solar-tracking system 10 of the invention. The solar-tracking system 10 is a portable system, and has a mounting base 12 that is rotatable for azimuth setting. Upstanding from the base is a vertical support column 14 which terminates in an upper, circular dial-plate 16 having angular indicia thereon. The angle "D" shown in FIG. 1 is the latitude, and can vary from 0 degree at the equator to 90 degrees at the North Pole.

Coupled to the dial-plate is a polar shaft 20, which is pivotally connected to the dial-plate 16, which shaft 20 is pivotal for latitude-settings. A set screw and nut 22 traveling in an arcuate groove 24 formed in the dial-plate 16, and connected to an end portion of the shaft 20, allows for repositioning of the pivotal shaft 20 depending on a particular latitude. Mounted in the shaft 20 is an interior, rotatable polar shaft 26. Mounted to the upper, as shown, or lower, end of the pivotal shaft 20 is a right-ascension drive motor 24 which drives the polar shaft 26, which motor 24 rotates the shaft 26 at rate of 366.25 revs./year in the clockwise direction. Further, secured to the upper end of the polar shaft 26 is a counter orbiting drive motor 30, which rotates an orbital shaft 32 at a rate of 1 rev./year in the counter-clockwise direction. The orbiting drive motor 30 is mounted to the upper end of polar shaft 26 by means of a bracket-mount 30'. The drive motor rotates shaft 32 by means of bearing assembly 30". Secured to the shaft 32 is a solar reflective concentrator 36 via a sun-pointing mounting shaft 38. The angle "a" defined as the angle formed by the central longitudinal axes of the shafts 26 and 38 is a fixed 23.45 degrees, which is the angle of tilt of the earth's axis. The longitudinal axis of the shaft 26 points toward the celestial polar point.

A key innovation of the solar-tracking system 10 is the sun tracking method consisting of two constant velocity rotation inputs at a permanently fixed 23.45 degree angle to each other as described above; namely: Counter-polar driving rotation at 366.25 revs/year CW., and counter-orbital drive rotation at 1 rev/year CCW. The polar drive shaft 26 is parallel to the earth's axis, and inputs at 366.25 revs/year clockwise—"undoing" the counterclockwise rotation of the earth. Orbiting drive shaft 32 is parallel to the axis of the orbit and inputs 1 rev/year counterclockwise, "undoing" the sun's apparent orbiting motion. The result is a sum-vector product that gives 365.25 solar days, or revolutions/year about the polar axis of the sun-pointing heliocentric distance vector (the paraboloid's centerline or shaft 38). Both the polar and orbital drive systems 24 and 30 are preferably harmonic drive gear motors that have zero backlash. However, in the case where short interval tracking is required, i.e. a solar cooking, only the polar input drive motor system 24 is used, while the date is set by setting the orbital shaft manually.

For the theoretical circular orbit, one may obtain the following vector sum products of the sun's velocity of 366.25−(1×cos 23.45 degrees) revs/year maximum, and 365.25−(1/cos 23.45 degrees) rev/year minimum, thus, the numerical maximum, 365.332 revs/year, which occurs on vernal and autumnal equinoxes, and the minimum, 365.160 revs/year, on summer and winter solstices. For true elliptic orbit, and the fact that the sun is at the focus of the ellipse, the orbital motion input is variable, resulting in a slightly different sum vector velocity of the apparent sun. The orbital input rotation will be altered by programmed input from a stepper motor to reflect that fact according to the Kepler's second law of planetary motion.

The measured difference of the angular travel between the input and output rotations captured at an instant, and expressed in units of time, is an Equation of Time—and in the case of our planet, a time difference between constant velocity of clock time and the variable velocity of the true solar time.

Figure 2:
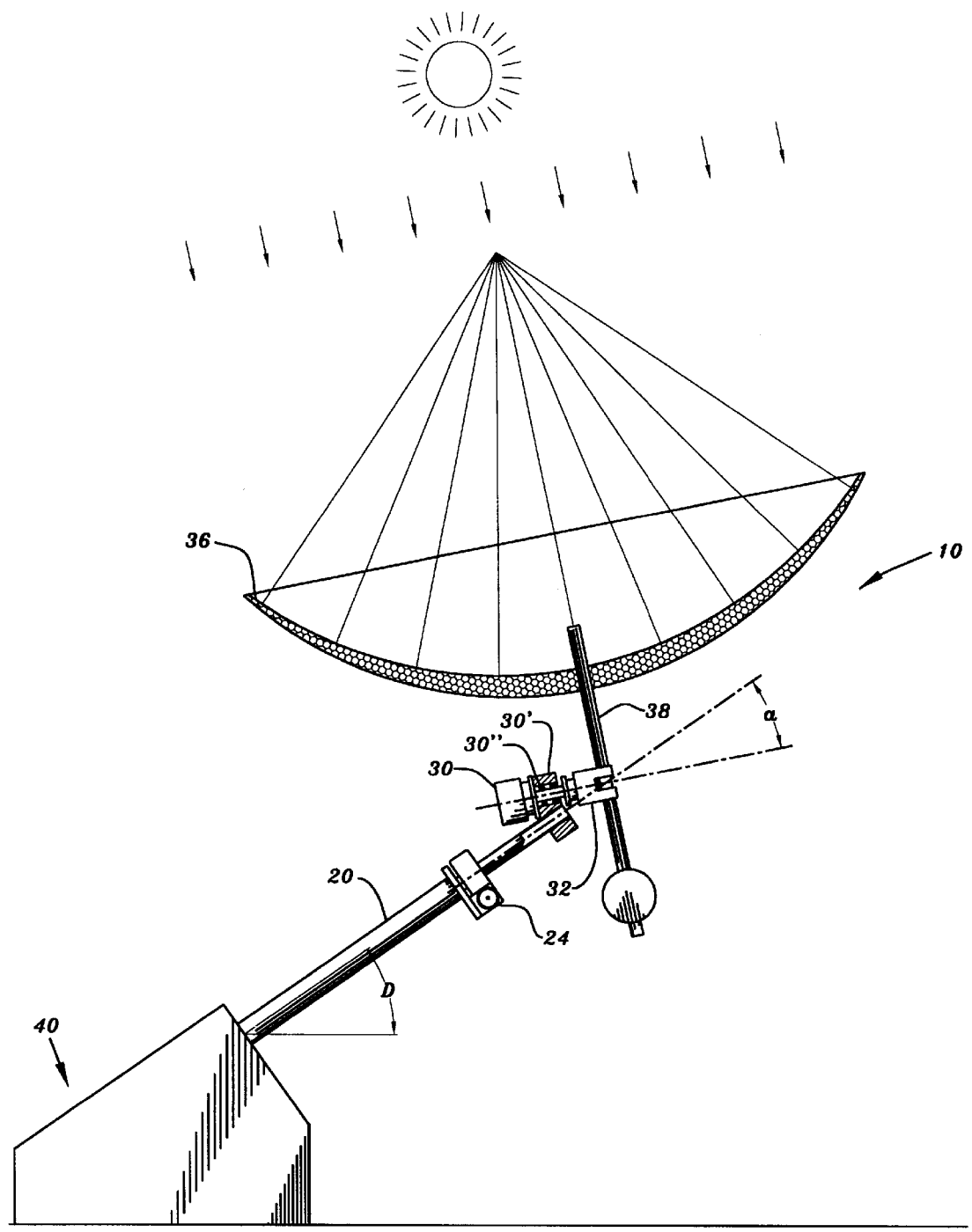
FIG. 2 is a side elevational view of the second embodiment of the invention as a fixed, stationary unit.

Referring to FIG. 2, there is shown the solar-tracking system 10 of the invention being used as a fixed unit. In this case, the mounting base 12 and vertical column 14 are replaced by a stationary pedestal 40. Otherwise, the remaining elements are the same as in the FIG. 1.

In FIG. 2, the orbital drive motor 24 is on the "day" side, left side of polar axis—on June 21 solar noon, whereas in FIG. 1 it is on the "night" side—December 21 solar noon, which positions mimic the true positions of the earth in its orbit.

The very same solar-tracking system of the system 10 may be used for a special-purpose, solar-oriented telescope which is directed to a chosen region of the sun.

The system of the present invention may also be used in a celestial apparatus, such an apparatus simulating the positions of stars, a star-rise and star set for a given observer on earth.

While a specific embodiment of the invention has been shown and described, it is to be understood that numerous changes and modifications may be made therein without departing from the scope and spirit of the invention as set forth in the appended claims.

What I claim is:

1. A sun-tracking apparatus for use with solar-dependent equipment and celestial apparatus, comprising:
    mounting means;
    a rotatable polar shaft having a polar axis;
    a rotatable orbital shaft having a longitudinal axis;
    a first polar drive means operatively connected to said polar shaft;
    a second orbital drive means operatively connected to said orbital shaft;
    means for mounting said second orbital drive means to said polar shaft;
    said polar axis of said polar shaft and said longitudinal axis of said orbital shaft forming an angle approximately equal to the angle of tilt of the earth's axis;
    said first drive means rotating said polar shaft at a first rate approximately equal to the rate of rotation of the earth about its axis; said second drive means rotating said orbital shaft at a second rate close to the rate of the orbital revolution of the earth about the sun.

2. The apparatus according to claim 1, wherein said first polar drive means is connected to said mounting means.

3. The apparatus according to claim 2, wherein said mounting means comprises a mounting shaft having a first end and a second end, and a mounting support means; said first polar drive means being mounted to said mounting shaft.

4. The apparatus according to claim 3, wherein said first polar drive means is mounted at said second end of said mounting shaft; said polar shaft being at least partially telescopingly received in said mounting shaft for rotation therein.

5. The apparatus according to claim 3, wherein said first end of said mounting shaft is pivotally connected to said mounting support means, whereby said mounting shaft may be pivoted for changing latitude setting.

6. The apparatus according to claim 5, wherein said mounting support means comprises indicia means for indicating latitude setting as said mounting shaft is pivoted.

7. The apparatus according to claim 1, wherein said angle is approximately 23.45 degrees.

8. The apparatus according to claim 1, wherein said first rate is equal to approximately 366.25 revolutions per year in the clockwise direction; and said second rate is equal to approximately 1 revolution per year in the counterclockwise direction.

9. The apparatus according to claim 1, further comprising a mounting shaft coupled to said orbital shaft, having a longitudinal axis; said mounting shaft being mounted to said orbital shaft such that said mounting shaft is at a right angle relative to said longitudinal axis of said orbital shaft.

10. The apparatus according to claim 9, further comprising a solar-dependent element affixed to said mounting shaft; said solar-dependent element comprising one of a: solar reflector, solar photovoltaic panel, and solar directed telescope.

11. A method for tracking the sun for use with solar-dependent equipment, such as solar reflectors, solar photovoltaic panels, and special-purpose solar-telescopes to observe a chosen region on the sun, which method utilizes an azimuth-zenith mount, a rotatable polar shaft having a polar axis, a rotatable orbital shaft having a longitudinal axis, a first polar drive means operatively connected to said polar shaft, a second orbital drive means operatively connected to said orbital shaft, said method comprising:
    (a) orienting said polar shaft in respect to the azimuth-zenith mount at a specific angular orientation dependent upon latitude;
    (b) rotating said polar shaft at a first rate equal to approximately the rate of rotation of the earth;
    (c) rotating said orbital shaft at a second rate equal to approximately the rate of revolution of the earth about the sun; and
    (d) mounting said polar and orbital shafts relative to each other whereby said polar and orbital axes form an acute angle at least approximately equal to the angle of tilt of the earth;
    said first rate being approximately equal to the rate of rotation of the earth about its axis, and said second rate being approximately equal to the rate of the orbital revolution of the earth about the sun.

12. The method according to claim 11, wherein said angle is equal to approximately 23.45 degrees.

13. The method according to claim 11, wherein said step (b) comprises rotating the polar shaft in the clockwise direction, and wherein said step (c) comprises rotating said orbital shaft in the counter-clockwise direction.

14. The method according to claim 13, wherein said first rate is equal to approximately 366.25 revolutions per year, and said second rate is equal to approximately 1 revolution per year.

15. In a solar-dependent apparatus, which apparatus comprises at least one of the following elements: a solar reflector, solar photovoltaic panel, and a telescope means, which apparatus also comprises position-orienting means for adjusting the position of said at least one element, the improvement comprising:
    a rotatable polar shaft having a polar axis;
    a rotatable orbital shaft having a longitudinal axis;
    a first polar drive means operatively connected to said polar shaft;

a second orbital drive means operatively connected to said orbital shaft;

means for mounting said second orbital drive means to said polar shaft;

said polar axes of said polar shaft and said orbital shaft forming an angle equal to the angle of tilt of the earth's axis; and mounting means for connecting said orbital shaft to said at least one element;

said second drive means rotating said orbital shaft at a second rate close to the rate of the orbital revolution of the earth about the sun.

* * * * *